Patented Aug. 13, 1940

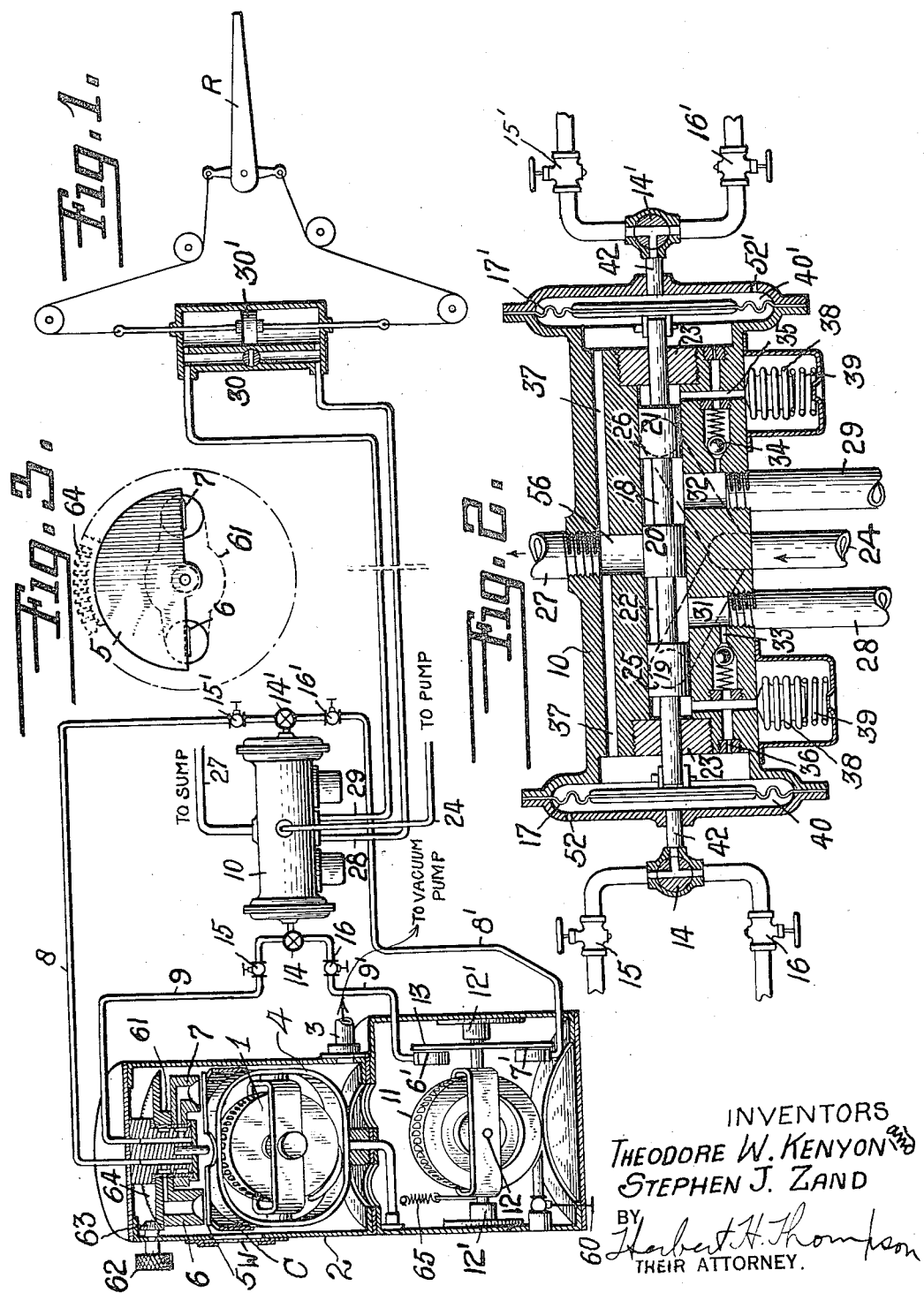

2,210,917

UNITED STATES PATENT OFFICE 2,210,917

REACTIVE SERVO SYSTEM FOR AUTOMATIC PILOTS

Theodore W. Kenyon, Huntington, and Stephen J. Zand, Forest Hills, N. Y., assignors to Sperry Gyroscope Company, Inc., Brooklyn, N. Y., a corporation of New York Application June 19, 1937, Serial No. 149,136
Renewed April 12, 1940

22 Claims. (Cl. 244—78)

This invention relates to automatic pilots for dirigible craft, especially for aircraft.

In the present standard pilot, the rudder or other control surface is given a deflection proportional to the deviation from the desired course or attitude. This system necessitates a follow-back connection from the rudder to the controller or change of attitude detector, which is usually made by long cable connections between the rudder and detector. Prior systems also fail to take into account the fact that very much less rudder movements are required to make a turn at a predetermined rate at high air speed than at low air speed, so that an adjustment that is correct for one speed may be unsatisfactory for another speed. This is becoming of increasing importance due to the great variations in speed now obtainable in aircraft between the top speed and the reduced speed obtainable by use of different high lift devices such as flaps and the like.

According to our invention, we propose to limit the amount of rudder movement by the unbalanced dynamic air pressure exerted on the rudder, which, of course, is substantially equal to the turning moment exerted on the plane by the control surface, which causes the turn. By balancing this reactive pressure against a signal which is proportional to the amount of attitude or course deviation or rate of deviation or preferably a combination of the two, we are enabled to obtain an accurate and satisfactory control at all speeds and at the same time eliminate all mechanical or other follow-back systems to the position maintaining means or signal originating device.

In the drawing, our invention is shown as applied to one axis control only, in this instance to the control in azimuth, but it will be understood that our invention is equally adapted to the control in elevation or in bank.

Fig. 1 shows a diagrammatic view of our rudder control system, the gyro element being in sectional perspective.

Fig. 2 is a longitudinal section of our preferred form of relay valve for actuating the servo motor.

Fig. 3 is a detailed plan view of the pick-off device at the directional gyroscope.

The position maintaining means we have illustrated for maintaining a course or detecting a change in course is one form of directional gyroscope 1 mounted within a closed casing 2 from which the air is continuously exhausted through pipe 3. The pick-off from the gyroscope should be of a type wherein the signal strength is proportional to deviation at least within a limited angle to each side of the normal position. It is shown as a semicircular cut-off disc 5 secured to the vertical ring 4 and normally equally bisecting ports 6 and 7 leading through pipes 8 and 9 to the chambers 40 and 40' on opposite sides of the opposing diaphragm 17 and 17' connected to a relay valve 10. The rotor 1 may be spun by any suitable means such as pneumatic or electric, the former being shown conventionally. Course changes may be effected as by turning the member 61 on which port members 6 and 7 are mounted by means of knob 62, piston 63, and gear 64 on member 61. For more complete details of this construction, reference is had to Fig. 3 of the patent to M. F. Bates, 2,066,194, December 29, 1936. The compass card C is visible through window W.

If desired, an angular rate device, such as a rate of turn gyro 11, centralized by spring 65, may also be employed. Said gyro is shown as enclosed in the same casing with the directional gyroscope and is mounted for precession about a horizontal axis 12' and for spinning about axis 12. Said gyro is also shown as carrying a semicircular cut-off disc 13 which may be similar to disc 5 and cooperates with similar ports 6' and 7', which may lead through pipes 8' and 9' into the same chambers 40 and 40' of the relay valve 10 as do the ports on the directional gyroscope.

The two gyroscopic controls may be used either separately or together as by turning the three-position valves 14, 14'. In the position shown in Fig. 2, both controls are being used, the relative strength of which may be controlled by adjusting the pairs of throttle valves 15, 15' or 16, 16', or both. Also the speed of the turn gyro rotor 11 may be varied by throttle valve 60 for the same purpose. To use the control from the directional gyroscope only, the valve 14 should be rotated counterclockwise through 90° and the valve 14' clockwise through 90°, while for control from the turn indicator gyroscope only, the valves would be similarly oppositely rotated 90° from the positions shown in the drawing.

Referring now to the details of the relay valve, this is shown as having at its ends chambers 40 and 40' each enclosing a flexible diaphragm or piston 17, 17' which divide each chamber into two parts. The outer surface of each diaphragm is exposed to the air pressure furnished from the kick-off ports at the gyroscope or gyroscopes, which in this instance is negative air pressure. These diaphragms are secured at their inwardly facing disc centers to a common valve stem or piston rod 18 extending longitudinally through the relay valve and having a plurality of collars or piston members 19, 20, 21 thereon slidable in the cylinder 22, which is closed at each end by packing glands 23. Each of the compartments 40 and 40' is connected to the atmosphere through a bleed opening 52, 52', either in the walls of the chambers themselves or at any point connected thereto. Air is drawn through said leaks. The air in the chamber is drawn out through the pipe connection 42, at a rate proportional to the extent of uncovering of the connected ports at the gyroscopes. The effective pressure in compartments 40 and 40', acting on the valve, is hence a function not only of the differential amount of opening of the two ports 6, 7 at the directional gyroscope and the corresponding two ports at the turn indicator gyroscope, but it is also a function of the relative duration of variation in the direction and amount of opening of the ports of the two gyroscopes. In other words, a time integrating effect is introduced. The result is that although the valve 16 from the turn indicator gyroscope may be opened as wide as or wider than the valve 15 in the directional gyroscope, and therefore the former may temporarily tend to preponderate, the directional gyroscope in the long run preponderates because the control therefrom remains in the same direction as long as the ship is off course in one direction, while the control from the turn indicator gyroscope reverses every time the ship reverses its direction of yaw and therefore changes quite rapidly. The stronger the control from the turn indicator gyroscope is made relative to the directional gyroscope, the greater will be the damping effect on the ship's yaw. In other words, the slower the ship will be brought back to its original course, being brought back in increments as the turn indicator opposes the control from the directional gyroscope every time the ship starts back toward its set course. Obviously, other signal originating devices, such as a magnetic compass or radio, may also be employed to add their air impulses to the other two in chambers 40 and 40'.

Oil under pressure is supplied by a pump (not shown) through pipe 24, which is connected through cross channels to ports 25, 26 in the cylinder, normally closed by pistons 19 and 21, respectively. The central outlet port 56 is normally closed by the central piston 20, which port, is connected to a pipe 27 leading to the sump (also not shown). The pipes 28 and 29 connecting the valve to the servo motor 30 are shown as connected to ports 31 and 32 located between the several pistons. Also connected to each of ports 31 and 32 is a restricted bypass passage 33 normally closed by spring pressed ball 34 or other valve, and communicating through passage 35 with the cylinder beyond the pistons 19 or 21, as the case may be. A greatly restricted orifice 36 is also provided, connecting passage 35 with return passage 37 to the return pipe 27. Preferably, also, we provide a pressure storage chamber 38 in communication with the passage 35, said chamber being shown as in the form of flexible container having its inside in communication with passage 35 and normally spring loaded by coil spring 39. The effective area of said pistons 17 and 17' is made many times that of the effective area of the outer faces of collar-pistons 19 and 21, because the air pressures used are only a fraction of the hydraulic pressures needed to move the rudder. The ratio shown in Fig. 2 is on the order of 50:1 or even higher.

The operation of our invention is as follows: Assuming a given deviation of the craft from its course causing air pressure in chamber 40 to build up beyond that in 40' by a predetermined amount, the piston rod 18 will be moved to the right in Fig. 2, thus placing the port 26, connected to the pressure pipe 24, in communication with port 32 and pipe 29. At the same time pipe 28 and port 31 will be placed in communication with outlet port 56. Therefore, oil will flow through pipe 29 into the right hand end of the cylinder 30, causing movement of the rudder R in a counter-clockwise direction. As the rudder is moved, the air pressure against the same will gradually increase, thus causing the pressure to rise in the pipe 29 beyond the minimum required to move the piston 30' against friction, etc. This rising pressure lifts the ball 34 from its seat and the oil under pressure enters the space to the right of the piston 21, building up pressure behind the piston to oppose the differential signal pressure on the diaphragm 17 and 17'. The result will be that the rudder will stop moving as soon as these effective pressures are balanced, i. e., as soon as the oil pressure per unit area multiplied by the effective area of the piston 21 (or 19) equals the differential air pressure multiplied by the effective area of the piston 17 (or 17'). Thus the rudder movements are limited by the dyamic air pressure thereon, so that the rudder movement is proportional to course deviation (modified by rate of turn) and inversely proportional to airspeed. As the craft returns to its course, the signal pressure will be reduced usually somewhat faster than the rudder pressure due to the angular momentum of the craft, thereby bringing the rudder back to its neutral position slightly before the craft returns to such position, which is desirable in order to damp out oscillations. This result is accentuated by the employment of the pressure reservoirs 38, which become expanded while the oil is under pressure and give up their pressure slowly so as to prolong the counter pressure on the piston, the pressure, however, being gradually reduced through the orifices 36. If the turn gyroscope control is also in use, the rate of turn would introduce an additional factor, which assists in accurate control and in preventing hunting. The rate of turn gyroscope also operates to limit the rate of turn, where the course is changed through knob 62, since it opposes any turn of the craft and limits its rate.

From the foregoing description it should also be apparent that our invention possesses a marked advantage over prior hydraulically controlled automatic pilots in that the controls are not locked when no signal is being sent from the master controller. In the ordinary systems the liquid valves are closed except when the control surface is being readjusted, thus locking the controls against displacement. In our system, on the other hand, if a sudden side gust should strike the rudder, for instance, the resulting increased pressure transmitted to the fluid in the servomotor would cause one of balls 34 to lift, thus admitting pressure fluid to one side of one of the pistons 19 or 21, causing the valve stem to move to open the ports just as a primary signal would do, thus permitting the weather-vaning or feathering movement of the rudder when no primary signal is being received. This avoids excessive rudder strain and results in smoother operation of the controls, without lessening the accuracy of the airplane control from the gyroscopes.

It should also be observed that, contrary to the relay valves of the prior art, our valve neither requires nor uses any centralizing springs, the primary air impulses being balanced solely against the secondary oil pressure. This not only results in much greater sensitivity of control, since when springs are used an appreciable air pressure must be built up before the spring tension is overcome, but also affords the possibility of regulating the amount and velocity of rudder throw by a valve in the air supply line instead of by a valve in the oil line, as is now common practice. Thus, by partially closing valves 15 and 15' if 16 and 16' are closed, or by having all valves partially closed, the average effective air pressure on diaphragms 17 and 17' is throttled down, thereby reducing the average oil pressure supplied to the cylinder 30, since such oil pressure in our system is always directly proportional to the said air pressure. In our invention, therefore, no oil throttle or "speed" valves or pressure reducing by-pass valves need be employed. Claims on this improvement, however, are reserved for our co-pending application, Serial No. 200,084, filed April 5, 1938, for Automatic pilots for dirigible craft.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In an automatic pilot for aircraft, the combination with position maintaining means, a relay valve, differential fluid pressure means actuated by relative turning of the craft and said position means for moving said valve, a fluid pressure servomotor operated from said relay valve for turning a control surface of the aircraft, and means responsive to back pressure from said surface through said last mentioned fluid for opposing the first mentioned pressure on said valve to limit control surface throw.

2. In an automatic pilot for aircraft, the combination with position maintaining means, a relay valve, differential air pressure means actuated by relative turning of the craft and said position means for moving said valve, a hydraulic servomotor operated from said relay valve for turning a control surface of the aircraft, and means in said valve subject to back pressure from said surface through said hydraulic liquid for opposing the air pressure on said valve to limit control surface throw.

3. In an automatic pilot for aircraft, the combination with a gyroscope, a differential air flow means actuated by relative turning of the craft and gyroscope, a hydraulic servomotor for turning a control surface of the aircraft, and a pneumatically operated hydraulic valve operated from the differential air pressure created by said means for controlling said servomotor, said valve having a pressure surface exposed to pressure in the operating liquid between the valve and the servomotor, whereby said valve is self closing as the pressure on the control surface rises.

4. A fluid pressure automatic pilot for aircraft as claimed in claim 1, having delayed action means for delaying the back pressure on said valve to cause said valve to return to its shut-off position before the aircraft returns to its original heading.

5. In a pneumatic-hydraulic automatic pilot for aircraft, a course maintaining means a relay valve comprising a reversing piston valve having a shut-off mid position and adapted to cause pressure liquid flow in either direction as it is moved right or left, larger piston exposed to air pressure controlled by said course maintaining means also secured to said piston valve, and by-pass connections for transmitting liquid pressure behind said piston valve to oppose movement initiated by the said air pistons.

6. In an automatic pilot for aircraft, the combination with position maintaining means, a pick-off device thereat giving a signal the strength of which is proportional to deviation of the craft, servo means for operating the control surface of the aircraft, and an intermediate controller between said position means and servo motor and responsive to the difference between said signal and the counter pressure of said surface on said motor, for governing said motor.

7. An automatic pilot as claimed in claim 6, having a rate of turn device and a proportional pick-off therefrom, the signal from which is combined with the signal from said position maintaining means.

8. An automatic pilot as claimed in claim 6, having delayed action means for delaying the release of the counter pressure on said intermediate controller.

9. In an automatic pilot for aircraft, the combination with position maintaining means, a pick-off device thereat giving an air pressure signal the strength of which is proportional to the amount of turn of the craft, servo means for operating the control surface of the aircraft, and an intermediate controller between said position means and servo motor and responsive to the difference between said signal and the counter pressure of said surface on said motor, for governing said motor.

10. A fluid servo motor system for aircraft as claimed in claim 19, having delayed action means for delaying the release of the counterpressure on said piston means.

11. In a pneumatic-hydraulic automatic pilot for aircraft, a course maintaining instrument, a rate of turn instrument, means for continuously withdrawing air from each, a pair of air ports at each instrument, a cut-off device rotatable with each instrument adjacent said ports to oppositely vary the air flow therefrom, piston divided chambers having air leaks, pipes connecting each port with a chamber, one port of each instrument leading into the same chamber, and a hydraulic valve moved by the differential pressure in said chambers.

12. A pneumatic-hydraulic automatic pilot as claimed in claim 11, having means for cutting off or varying at will the flow through said pipes, whereby the valve may be primarily or entirely controlled from either instrument.

13. In a fluid pressure automatic pilot for aircraft, a directional gyroscope, an angular rate gyroscope, a common source of pressure, a pair of differential intake ports adjacent each, the relative flow through each pair being governed by the relative position of the gyroscope and craft, two air chambers having air leaks, pipes connecting one chamber with one port at each of said gyroscopes, pipes connecting the other chamber with the other port at each gyroscope, and a relay valve differentially controlled by the time integrated pressures in said chambers.

14. A pneumatic automatic pilot as claimed in claim 13, having means for cutting off or varying at will the flow through said pipes, whereby the valve may be primarily or entirely controlled from either instrument.

15. In a fluid pressure automatic pilot for craft, a directional gyroscope, an angular rate gyroscope, and enclosure for each, a source of negative pressure for withdrawing air from each, a pair of differential intake ports adjacent each, the relative flow through each pair being governed by the relative position of the gyroscope and craft, chambers having air leaks, pipes connecting a chamber with a port at each of said gyroscopes, pipes connecting another chamber with another port at each gyroscope, and a relay valve differentially controlled by the pressures in said chambers.

16. In a hydraulic automatic pilot for aircraft, a hydraulic servo motor, a control valve therefor for causing movement of the motor in one direction or the other upon right or left movement of the valve and for locking said motor in the standstill position when said valve is centralized, and a control surface actuated by said motor, said valve being also subject to hydraulic back pressure in the system, whereby it is moved to permit movement of said motor and surface in the direction of excessive pressure on said surface in one direction or the other.

17. In an automatic pilot for aircraft, the combination with position maintaining means, a pick-off device thereat giving a signal the strength of which is proportional to deviation of the craft, servo means for operating the control surface of the aircraft, and an intermediate controller between said position means and servo motor and responsive to the difference between said signal and the counter pressure of said surface on said motor, for governing said motor, there being no other restoring means such as centralizing springs acting on said intermediate controller and no other follow-back between said servo means and said pick-off device.

18. In a fluid servo motor system for aircraft, a source of governing differential air pressure impulses, a fluid pressure motor for turning the control surface, an operating valve therefor controlling the flow of fluid to and from said motor, the moving parts of said valve being moved by the governing impulses, and fluid pressure responsive means subject to the mean effective pressure of the fluid in said motor for opposing the governing impulses, whereby the reactive air pressure on the control surface is reflected back to said valve.

19. In an automatic pilot for aircraft employing a fluid operated servo motor system, a course maintaining device, a differential pick-off thereat giving a governing impulse proportional to deviation from course, a fluid pressure motor for turning the rudder, an operating valve therefor controlling the flow of fluid to and from said motor, including a valve member subject to said governing impulse, piston means connected with said member, and means for leading the pressure fluid to said piston means to resist or oppose the governing impulse.

20. In an automatic pilot for aircraft employing a fluid operated servo motor system, a course maintaining device, a differential pick-off thereat giving a governing impulse proportonal to deviation from course, a fluid pressure motor for turning the rudder, an operating valve therefor movable in either direction from its normal shut-off position to cause pressure fluid flow in either direction to said motor, including a valve member movable in either direction by the governing impulse from said pick-off, piston means connected with said member, and means for supplying the pressure fluid to one or the other piston means to resist or oppose the governing impulse.

21. In an aircraft, a pneumatic-hydraulic automatic pilot for positioning control surfaces of said aircraft having a gyroscopic rate of turn instrument, a gyroscopic course maintaining instrument, a common means for continuously withdrawing air from each, a pair of air ports at each instrument, a cut-off device rotatable with each instrument adjacent said pairs of air ports to oppositely vary the air flow from the individual ports of each pair, whereby differential air pressures are produced proportional to the relative movement of each instrument and the craft, piston means actuated by said differential air pressures, a hydraulic valve controlled by said piston means, and a hydraulic servo motor controlled by said hydraulic valve for positioning said control surfaces.

22. In an automatic pilot for aircraft, the combination with position maintaining means, a pick-off device thereat giving a weak pressure signal the strength of which is proportional to deviation of the craft, servo means of much greater pressure for operating the control surface of the aircraft, and a power multiplying intermediate controller between said position means and servo motor and responsive only to the difference between said signal pressure as applied to a large area and the counter pressure of said surface on said motor as applied to a much smaller area, for governing said motor, whereby no centralizing springs are employed.

THEODORE W. KENYON.
STEPHEN J. ZAND.